Patented Aug. 10, 1954

2,685,793

UNITED STATES PATENT OFFICE 2,685,793

ANIMAL DIP TESTING METHOD AND COMPOSITION

Nathan B. Carson, Chicago, and Carl W. Banks, Bedford Park, Ill., assignors to William Cooper & Nephews, Inc., Chicago, Ill., a corporation of Illinois No Drawing. Application June 11, 1952, Serial No. 293,002

13 Claims. (Cl. 73—53)

This invention relates to a method and composition for testing animal dip compositions, and more particularly, to a method and composition or reagent that may be used to determine the insecticide content of the animal dip composition or dispersions currently used.

Certain insecticides, the most important of which is toxaphene, have proven extremely satisfactory for the control of many external parasites affecting livestock, including ticks and certain types of flies. Such insecticides are incorporated in aqueous bath or dip compositions in predetermined concentrations and the animals to be treated are driven through such dip compositions to free them from the various body parasites.

The animal dip compositions or dispersions currently used are dilute oil-in-water dispersions, having an active insecticide dissolved in the dispersed oil-phase. The control of the insecticide content thereof is of critical importance and one of the critically necessary features in the control of the insecticide content is stability of the dispersion itself. Insufficiently stable dispersions have proven to be incapable of preventing the building up of a relatively high concentration of the active insecticide ingredients in the scum that forms on the surface of the vat through which the animals are driven. This scum is built up during use of the dip from the hair, straw, sand, grass and the like carried into the vat by the animals. Analysis of this scum in some instances has shown as high as 35% concentration of the active insecticide ingredients, although the normal concentration of the active ingredient in the dip proper was kept of the order of 0.5% by weight. Since, in the case of some insecticides such as toxaphene, a concentration of over 1.5% can be fatal to susceptible animals, particularly calves, this building up of the concentration of the active ingredients in the scum formed on the surface of animal dip vats has resulted in a most dangerous situation. Not only does the build-up in concentration tend to deplete the concentration of the dip itself below therapeutic strength, but it endangers the lives of the animals themselves since, due to its sticky nature, the scum is liable to adhere to the backs of the animals as they emerge from the vat.

It is, therefore, necessary in formulating the dip to make the proper selection of the emulsifying agent, which term is used in a collective as well as an individual sense, so that building up of a concentration of the active ingredients in the scum formed on animal dip vats can be largely prevented. For this purpose, an emulsifying agent must be selected that is not only easily dispersible in the oily concentrate, but also is capable of forming a stable oil-in-water type of emulsion upon dilution. Where a suitable single emulsifying agent or a mixture of emulsifying agents is used, the concentration of the active ingredients does not build up to any substantial extent. For instance, where the concentration of the active ingredients is of the order of 0.5% by weight of the finished animal dip, if the proper emulsifying agent, or mixture of agents, is used, the concentration of the active ingredients in the scum will not rise above about 3%, and usually not over about 0.75%, even upon continued use of the dip.

The use of such extremely effective emulsifying agents as well as the accumulation in the dip composition of substantial quantities of animal-source impurities, however, creates another serious problem in the control of the insecticide content, viz., the problem of analytical determination of the insecticide concentration. As hereinbefore mentioned, the insecticide concentration must be closely controlled in order to have present an amount sufficient to destroy the parasites yet insufficient to kill the young animals.

The insecticide or toxicant concentration may be altered by evaporation of water, leakage, solution by rain or ground water, and selective adsorption of the toxicant on the hair and skin of animals passing through the bath. As a consequence, a method of ascertaining the concentration of the bath in the vat is necessary. Such a test must be simple enough to be executed successfully with a minimum of apparatus and in a very short time by an unskilled operator.

The chemical methods for analytical determination of the toxicants used are far too difficult and complex for an operator who is unskilled in the chemical arts. Of the physical methods that might be employed, measurement of the specific gravity of solutions of the toxicant in an organic solvent or mineral oil seemed to offer the most promise. However, in order to dissolve all the toxicant of a given dip sample in a standard mineral oil, it is necessary to effect a complete breakdown of all emulsification in the dip. The breakdown of the stable emulsifying agent-produced dispersion is itself very difficult, but the problem is further complicated by the presence of animal-source and soil impurities. Such impurities contain a plurality of natural emulsifiers and scum producers which tend to result in the formation of excessively flocculent matter which remains suspended in the mineral oil and prevents accurate hydrometer specific gravity readings.

It is, therefore, an object of the instant invention to provide an improved method and reagent for use in determining the toxicant content of dip compositions.

It is another object of the instant invention to provide an improved method and reagent for obtaining a suitable mineral oil solution of toxicant for accurate specific gravity determination.

It is a further object of the instant invention to provide an improved method and reagent for obtaining toxicant solutions for testing purposes that are not affected by the presence of impurities in the dip composition.

Other and further important objects of this invention will become apparent from the following description and appended claims.

As the active insecticide ingredient of the animal dip composition to be tested in the practice of our invention, any of the various oil soluble insecticides may be used, such as toxaphene, chlordane, and others. Toxaphene is a chlorinated camphene, which in its so-called 100% form contains about 67% by weight of chlorine. It is soluble in mineral oils, such as kerosene, but insoluble, or practically so, in water. Chlordane has the empirical formula $C_{10}H_6Cl_8$, and is believed to be 5,8-endo-dichloro-methylene-4-0-dihydro-2,3,5,6,7,8-hexachloro endane. Other oil soluble insecticides can be used in animal dips, such as benzene hexachloride and DDT, but these particular compounds are more usually used as dusting powders or as wettable powders in their application to animals.

The common liquid vehicle for an animal dip concentrate, which becomes the dispersed phase in the dip composition, is a mineral oil, such as kerosene, but other petroleum oil distillates of a type generally similar to kerosene may be employed.

In order to make the animal dip concentrate readily dispersible upon dilution with water, either a single emulsifying agent, or a mixture of emulsifying agents, collectively referred to herein as "an emulsifying agent", should be used that is dispersible both in the mineral oil vehicle and also in water, itself. Various specific emulsifying agents will be referred to hereinafter, but, in general, they should be present in the concentrate in percentages by weight of between 5 and 50%. On the basis of an animal dip concentrate containing 65 parts by weight of toxaphene, the following will indicate the broad ranges of proportions and the preferred proportions of the other ingredients:

*Broad ranges of composition*

Toxaphene, 65 parts by weight
Kerosene, 30 to 20 parts by weight
Emulsifying agent, 5 to 50 parts by weight

*Preferred compositions*

Toxaphene, 65 parts by weight
Kerosene, 25 parts by weight
Emulsifying agent, 10 parts by weight The following is a list of some of the proprietary emulsifying agents that have been found to be satisfactory for use in the animal dip concentrate to be tested in the practice of our invention, together with a chemical description of the proprietary products and reference to their solubility in oil and water:

| Proprietary Products | Chemical Designation and Properties |
|---|---|
| Triton X-155 | (Dimeric alkylated aryl polyether alcohol, believed to be an alkyl phenoxy-polyethoxyethanol.) Both oil and water soluble. |
| Quaker Chemical Company's TG-3808. | (Polyethylene Glycol ester of mixed Fatty Acids.) Primarily oil soluble. Slightly water soluble. |
| Tween 81 | (Polyoxyethylene ether of sorbitan monooleate.) Both oil and water soluble. |
| Santomerse #3 | (Alkyl aryl sulfonate.) Primarily water soluble. Slightly oil soluble. |
| Atlas G-1266 | (Polyoxyethylene Sorbitol Ester of mixed Fatty Acids.) Primarily oil soluble. Slightly water soluble. |
| Tergitol 7 | (Sodium sulfate of heptadecanol, believed to be 3,9-Diethyltridecanol-6 Sodium Sulfate.) Water soluble. |
| Igepal #200 | (Alkyl aryl polyethylene glycol.) Water soluble. Oil dispersible. |
| Emcol H-74 | (Balanced blend of polyhydric alcohols incompletely esterified with higher fatty acids and partially esterified with dicarboxylic acids.) Non-ionic emulsifier. Soluble in solutions of toxaphene in kerosene. Water dispersible. |

The following examples, in which parts by weight are given, will serve to illustrate various compositions of an animal dip concentrate that may be used to prepare dip compositions that may be tested using the method and reagent of our invention:

*Example 1*

| | Parts by weight |
|---|---|
| Toxaphene | 65 |
| Kerosene | 20 |
| Atlas G-1226 | 5 |
| Tergitol 7 | 5 |
| Triton X-155 | 5 |

*Example 2*

| | |
|---|---|
| Toxaphene | 65 |
| Kerosene | 20 |
| Quaker TG 3808 | 5 |
| Triton X-155 | 5 |
| Tween 81 | 3 |
| Santomerse #3 | 2 |

*Example 3*

| | |
|---|---|
| Toxaphene | 65 |
| Kerosene | 25 |
| Quaker TG 3808 | 5 |
| Triton X-155 | 2.5 |
| Tween 81 | 1.5 |
| Santomerse #3 | 1 |

*Example 4*

| | |
|---|---|
| Toxaphene | 65 |
| Kerosene | 25 |
| Santomerse #3 | 2.5 |
| Igepal #200 | 7.5 |

*Example 5*

| | |
|---|---|
| Toxaphene | 65 |
| Kerosene | 25 |
| Emcol H-74 | 10 |

*Example 6*

| | |
|---|---|
| Toxaphene | 65 |
| Kerosene | 25 |
| Igepal #200 | 10 |

*Example 7*

| | |
|---|---|
| Toxaphene | 65 |
| Kerosene | 25 |
| Triton X-155 | 10 |

The composition of Example 4 has proved particularly satisfactory over a prolonged period of use. Certain variations may be made in the proportions by weight of the several ingredients, as follows:

|  | Preferred | Range |
| --- | --- | --- |
| Toxaphene | 65 | 65 |
| Kerosene | 25 | 28–20 |
| Santomerse #3 | 2.5 | 1–5 |
| Igepal #200 | 7.5 | 6–10 |

As stated previously, Santomerse #3 is an alkyl aryl sulfonate, specifically believed to be dodecyl benzene sodium sulfonate, which is primarily water soluble and is slightly oil soluble. Igepal #200 is an alkyl aryl polyethylene glycol, specifically believed to be a condensation product of ethylene oxide and an alkylated cresol, and is both water soluble and oil dispersible.

The formulae of Examples 5 to 7, inclusive, are ones in which a single emulsifying agent is used that is both oil and water dispersible. In these cases, the proportion of Emcol H-74, Igepal #200 and Triton X-155 can be as low as 3 parts by weight, or 3% of the animal dip concentrate, or may be as high as 15 parts by weight, or 15%, but, in general, increasing the proportion of these emulsifying agents above 10% gives no additional beneficial result.

In the preparation of the dip bath, any one of the foregoing concentrations is dispersed in a sufficient amount of water to obtain the desired toxicant concentration. For example, in the case of toxaphene the desired concentration is about 0.5 weight percent of the dip bath; and during use or after prolonged standing the concentration may be found to be within the range of from about 0.1 weight percent to about 2 weight percent. It, therefore, becomes necessary to check the concentration repeatedly during use as well as prior to use after prolonged standing of the dip bath in the vat.

The best method of the instant invention comprises agitating a predetermined quantity of the dip bath with a predetermined quantity of a mineral oil of known specific gravity, an alkyl aryl sulfonate wetting agent and ferric ammonium sulfate; and then determining the toxicant or insecticide content by determining the specific gravity of the oil layer that separates out after the agitation.

The toxicant or active insecticide employed in the dip bath is a chlorinated hydrocarbon which is water-insoluble and soluble in mineral oils, such as kerosene. In the preparation of the dip bath the insecticide dissolved in the mineral oil forms the dispersed phase of the oil-in-water dispersion. The amount of mineral oil so used is relatively minute, so a very substantial quantity of mineral oil must be added to the dip bath in order to obtain a sufficiently large oil layer volume to permit specific gravity measurement, for example, by the use of a hydrometer. Accordingly, the amount of mineral oil added may range from about 5 volume percent to about 50 volume percent of the dip bath sample to be tested, and preferably the amount added is about 10–20 volume percent of the sample.

Any mineral oil may be used, since such compounds are toxicant solvents which are water-immiscible and, therefore, capable of selectively dissolving the toxicant without disturbing the water-soluble ingredients in the aqueous phase of the bath. Such mineral oils include n-hexane, n-heptane, benzene and isooctane (2,2,4-trimethylpentane). However, it has been found that unusually superior results may be obtained in the practice of the invention by the use of isooctane. Isooctane has a low specific gravity so that it rises rapidly and separates easily from the aqueous phase. It does not form emulsions readily; it has a higher flash point and boiling point than most other suitable solvents; and the presence of such toxicants as toxaphene effects a marked change in the specific gravity of the isooctane.

Since the emulsifying agents present in the dip bath tend to effect emulsification with the mineral oils such as isooctane, it is preferable to break down all emulsification in the bath sample prior to extraction of the toxicant by addition of the mineral oil. However, the effect of the demulsifying agents of the instant invention is so strong that the mineral oil and such agents may be added simultaneously. The instant invention has, as one of its most important aspects, a key to the complete breakdown of emulsification in the bath. (Actually "substantially" complete breakdown sufficient to permit the formation of an oil layer suitable for specific gravity determination.)

The demulsifying agent combination of the instant invention constitutes a demulsifying reagent of unusual properties; uniquely suitable for the particular use herein described. Heretofore, the semi-emusified flocculent suspension created by the various animal-source impurities in the bath delayed greatly or rendered impossible sufficient clearing of the oil layer to permit accurate hydrometer readings. Moreover, certain of the emulsifying agents incorporated in the dip bath were so extremely effective that they prevented adequate demulsification by the use of ordinary demulsifying agents such as sodium chloride.

One of the critically necessary ingredients of the demulsifying reagent is ferric ammonium sulfate. It has been found that, acting in conjunction with a certain wetting agent, ferric ammonium sulfate has amazingly strong demulsifying action, particularly adapted to completely overcome the effect of the dip emulsifying agent as well as to effect rapid separation of the oil layer from the animal-source flocculent material normally present.

Another of the necessary ingredients is an alkyl aryl sulfonate wetting agent. Such wetting agents are well known in the art of surface active agents. Such compounds contain an aromatic benzene or naphthalene ring structure, having attached thereto an alkyl radical of a size suitable to impart the desired hydrophilic-hydrophobic properties to the molecule. The sodium alkyl aryl sulfonate wetting agents are the most widely used. In the practice of the invention it has been found that sodium alkyl naphthalene sulfonates are uniquely suitable and, therefore, preferred. The most common commercial embodiment thereof is sodium isopropylnaphthalene sulfonate.

In the practice of the invention, the demulsifying reagent is added to the bath sample in proportions such that the amounts of each of the foregoing ingredients added in volume per cent of the bath sample are about 0.1–5% of an alkyl aryl sulfonate wetting agent and about 0.1–5% of ferric ammonium sulfate. Preferably the amount of a wetting agent such as sodium alkyl naphthalene sulfonate is about 0.5–2%; and the amount of ferric ammonium sulfate is about 0.1–1% or a volume ratio of 2:1 for the sulfonate to the sulfate.

Also, it has been found quite advantageous to (as well as convenient for) the successful operation of the instant test in the hands of operators unskilled in the chemical arts to supply a demulsifying reagent combination ready for use. Such a reagent combination, comprises about 0.1–5 volume parts of a sodium alkyl aryl sulfonate wetting agent and about 0.1–5 volume parts of ferric ammonium sulfate. In other instances, it is necessary to supply the vat operator with the complete analytical reagent which comprises 100 volume parts of isooctane preferably, 2–10 volume parts of a sodium alkyl naphthalene sulfonate wetting agent preferably, and 1–5 volume parts of ferric ammonium sulfate. Equivalent proportions of other mineral oils and other wetting agents may be used.

*Example*

A one liter graduate mixing cylinder is charged with 800 ml. of a dip bath sample withdrawn from the vat. One teaspoon (about 3.7 ml.) of ferric ammonium sulfate and two teaspoons (about 7.4 ml.) of a sodium alkyl naphthalene sulfonate wetting agent are added to the charge and the charge is shaken vigorously to dissolve the ingredients. Then, 100 ml. of isooctane is poured into the cylinder and the charge is again shaken vigorously. The charge is then allowed to stand a few minutes until a clear isooctane layer has risen to the top. The specific gravity of the isooctane layer is then measured by means of an API scale hydrometer. A difference of 7 to 10 in API readings between pure isooctane and the isooctane layer indicates a toxaphene content in the dip sample of 0.4 to 0.6 weight percent.

It will, of course, be understood that various details of the invention may be varied through a wide range without departing from the principles of this invention and it is therefore, not the purpose to limit the patent granted hereon otherwise than necessitated by the scope of the appended claims.

Consistent with the principles of the instant invention, the present method is uniquely versatile in that it is operative even though substantial amounts of animal source impurities are present in the dip bath. For example, the charge obtained by carrying out a procedure that is the same as that just described, except that sodium chloride is used as a demulsifying agent, is essentially a three layer charge having a bottom aqueous layer and a flocculent sludge layer which fills almost entirely the space that should be occupied by an oil layer. The oil layer is so filled with the flocculent animal-source sludge layer that hydrometer readings cannot be taken. By the use of the instant demulsifying agent combination, however, a clear oil layer is obtained.

We claim as our invention:

1. A method of determining the insecticide content of an animal dip composition, that comprises agitating a predetermined quantity of said composition with a predetermined quantity of mineral oil of known specific gravity, an alkyl aryl sulfonate wetting agent and ferric ammonium sulfate; and then determining the insecticide content by determining the specific gravity of the oil layer that separates out after the agitation.

2. A method of determining the insecticide content of an animal dip composition, that comprises agitating a predetermined quantity of said composition with a predetermined quantity of isooctane, an alkyl aryl sulfonate wetting agent and ferric ammonium sulfate; and then determining the insecticide content by determining the specific gravity of the isooctane layer which rises to the top after the agitation.

3. A method of determining the insecticide content of an animal dip composition, that comprises agitating a predetermined quantity of said composition with a predetermined quantity of a mineral oil of known specific gravity, a sodium alkyl naphthalene sulfonate wetting agent and ferric ammonium sulfate; and then determining the insecticide content by determining the specific gravity of the oil layer that separates out after the agitation.

4. A method of determining the toxaphene content of an animal dip composition, that comprises agitating a predetermined quantity of said composition with a predetermined quantity of isooctane, a sodium alkyl naphthalene sulfonate wetting agent and ferric ammonium sulfate; and then determining the toxaphene content by determining the specific gravity of the isooctane layer which rises to the top after the agitation.

5. A method of determining the dispersed-phase chlorinated hydrocarbon insecticide content of a dilute oil-in-water dispersion, that comprises breaking the dispersion by the addition thereto of an alkyl aryl sulfonate wetting agent and ferric ammonium sulfate, thoroughly admixing therewith a water-immiscible mineral oil solvent for the insecticide, allowing the mineral oil layer to separate out from the mixture, and determining the insecticide content by determining the increase in the specific gravity of the oil.

6. A method of determining the dispersed-phase toxaphene content of a kerosene-in-water insecticidal dispersion, that comprises breaking the dispersion by the addition thereto of a sodium alkyl naphthalene sulfonate wetting agent and ferric ammonium sulfate in amounts sufficient to accomplish complete breakdown of the dispersion, thoroughly admixing with the dispersion 5–50% of its volume of isooctane, allowing the isooctane layer to separate out from the mixture and measuring the increase in specific gravity of the isooctane in said layer.

7. A vat-side dip test method suitable for use with dip compositions containing substantial amounts of animal-source impurities that comprises the steps of withdrawing 100 volume parts of the composition from the vat and admixing therewith 5–50 volume parts of isooctane, 0.1 to 5 volume parts of a sodium alkyl naphthalene sulfonate wetting agent and 0.1 to 5 volume parts of ferric ammonium sulphate; agitating the mixture to break down emulsification therein and then allowing the mixture to stand to permit separation of an isooctane layer; and measuring the specific gravity of the isooctane layer.

8. A method of determining the dispersed-phase chlorinated hydrocarbon insecticide content of a dilute oil-in-water dispersion wherein the oil phase consists of about 0.1 to about 2 weight percent of the dispersion and the dispersion contains substantial amounts of animal-source impurities, that comprises agitating therewith from 0.5 to 2 percent of its volume of a sodium alkyl naphthalene sulfonate wetting agent and from 0.1 to 1 percent of its volume of ferric ammonium sulfate and agitating therewith from 10 to 20 percent of its volume of isooctane, whereby a complete breakdown of emulsification therein is effected and a separate isooctane layer rises to the top of resulting broken dispersion; and then measuring the specific gravity of said isooctane layer to ascertain the extent to which that specific gravity exceeds the specific gravity of pure isooctane.

9. As a new demulsifying reagent for use in vat-side dip tests to accomplish complete breakdown of emulsification in dip dispersions, a composition comprising 0.1 to 5 volume parts of a sodium alkyl naphthalene sulfonate wetting agent and 0.1 to 5 volume parts of ferric ammonium sulfate.

10. As a new analytical reagent for insecticide content determination in animal dip dispersions, a composition comprising 100 volume parts of isooctane, 2–10 volume parts of a sodium alkyl naphthalene sulfonate wetting agent and 1–5 volume parts of ferric ammonium sulfate.

11. A method of determining the dispersed-phase toxaphene content of a kerosene-in-water insecticidal dispersion, that comprises breaking the dispersion by the addition thereto of a sodium isopropyl naphthalene sulfonate wetting agent and ferric ammonium sulfate in amounts sufficient to accomplish complete breakdown of the dispersion, thoroughly admixing with the dispersion 5–50% of its volume of isooctane, allowing the isooctane layer to separate out from the mixture and measuring the increase in specific gravity of the isooctane in said layer.

12. A method of determining the dispersed-phase chlorinated hydrocarbon insecticide content of a dilute oil-in-water dispersion wherein the oil phase consists of about 0.1 to about 2 weight percent of the dispersion and the dispersion contains substantial amounts of animal-source impurities, that comprises agitating therewith from 0.5 to 2 percent of its volume of a sodium isopropyl naphthalene sulfonate wetting agent and from 0.1 to 1 percent of its volume of ferric ammonium sulfate and agitating therewith from 10 to 20 percent of its volume of isooctane, whereby a complete breakdown of emulsification therein is effected and a separate isooctane layer rises to the top of resulting broken dispersion; and then measuring the specific gravity of said isooctane layer to ascertain the extent to which that specific gravity exceeds the specific gravity of pure isooctane.

13. As a new demulsifying reagent for use in vatside dip tests to accomplish complete breakdown of emulsification in dip dispersions, a composition comprising 0.1 to 5 volume parts of a sodium isopropyl naphthalene sulfonate wetting agent and 0.1 to 5 volume parts of ferric ammonium sulfate.

References Cited in the file of this patent

UNITED STATES PATENTS

| Number | Name | Date |
|---|---|---|
| 2,015,260 | De Groote | Sept. 25, 1935 |
| 2,107,473 | Elliott | Feb. 8, 1938 |
| 2,448,634 | Petrino | Sept. 7, 1948 |
| 2,543,871 | Salathiel | Mar. 6, 1951 |

OTHER REFERENCES

Bureau of Mines Report by D. B. Dow, No. 2688, May 1925.